United States Patent [19]
Ogawa

[11] Patent Number: 5,345,437
[45] Date of Patent: Sep. 6, 1994

[54] SYSTEM FOR CONTROLLING FREQUENCY MULTIPLEXING MODEMS

[75] Inventor: Tohru Ogawa, Kawasaki, Japan

[73] Assignee: Fujitsu Limited, Kawasaki, Japan

[21] Appl. No.: 59,052

[22] Filed: May 7, 1993

[30] Foreign Application Priority Data

May 12, 1992 [JP] Japan ................... 4-118815

[51] Int. Cl.$^5$ ..................... H04J 1/14; H04B 1/38
[52] U.S. Cl. ........................ 370/13; 370/76; 371/20.1; 375/8; 375/13
[58] Field of Search ............. 370/69.1, 76, 124, 17, 370/30, 50, 13, 14; 375/8, 13; 371/8.2, 11.2, 20.1, 20.4, 20.5; 379/15, 16, 26, 98

[56] References Cited

U.S. PATENT DOCUMENTS

| | | | |
|---|---|---|---|
| 4,398,299 | 8/1983 | Darling et al. | 375/8 |
| 4,847,880 | 7/1989 | Kamerman et al. | 375/8 |
| 4,891,806 | 1/1990 | Farias et al. | 370/110.1 |
| 4,922,534 | 5/1990 | Garniak et al. | 375/8 X |
| 5,052,024 | 9/1991 | Moran, III et al. | 375/8 X |
| 5,285,474 | 2/1994 | Chow et al. | 375/8 X |

FOREIGN PATENT DOCUMENTS 0409641 1/1991 European Pat. Off. .

Primary Examiner—Wellington Chin
Assistant Examiner—Melvin Marcelo

[57] ABSTRACT

A frequency multiplexing control system includes a first modem unit connected to a transmission line, and a second modem unit connected to the transmission line. The first and second modem units communicate with each other via a plurality of primary channels and a secondary channel. The primary and secondary channels have different frequency bands. A plurality of signal detection units are respectively provided in the first and second modem units, to detect an abnormal primary channel and send to the second and first modem units, information concerning the abnormal primary channel via the secondary channel. A plurality of disabling units are respectively provided in the first and second modem units, to disable the abnormal primary channel in response to the received information and to send a training signal for recovering the abnormal primary channel to the transmission line.

10 Claims, 16 Drawing Sheets

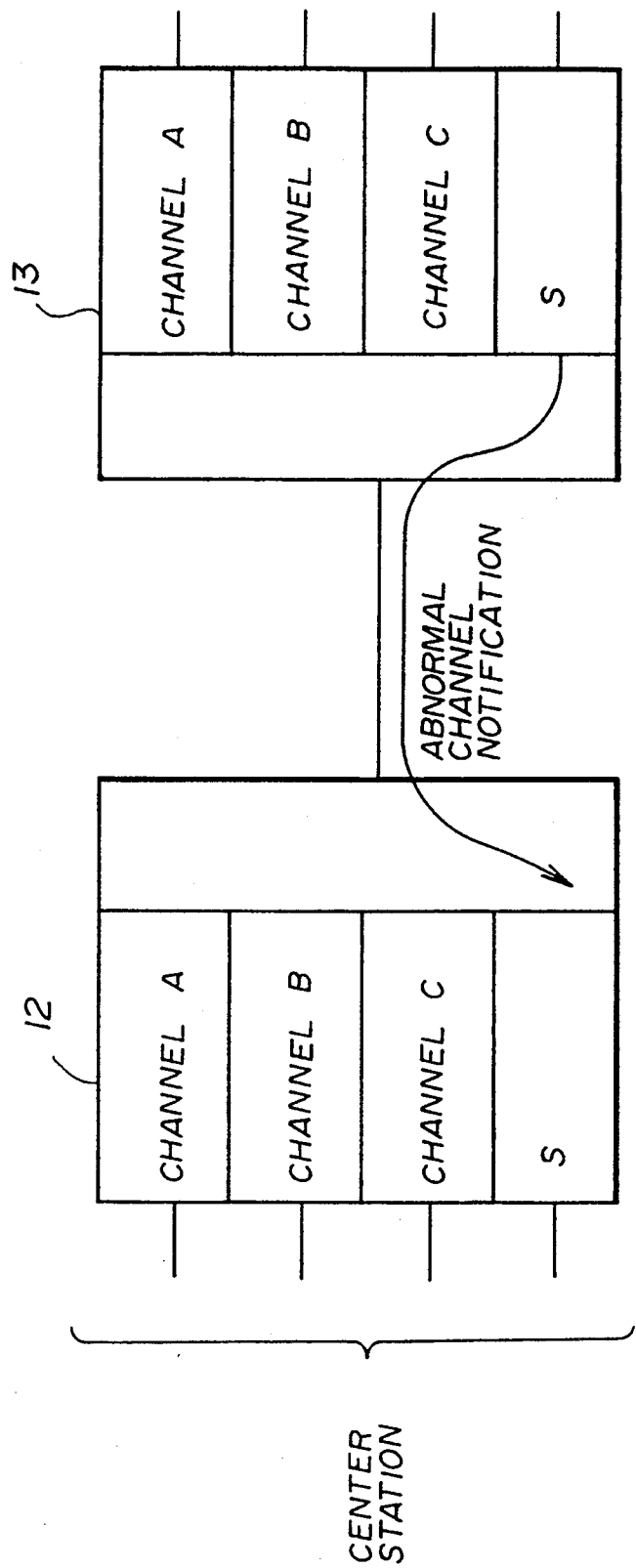

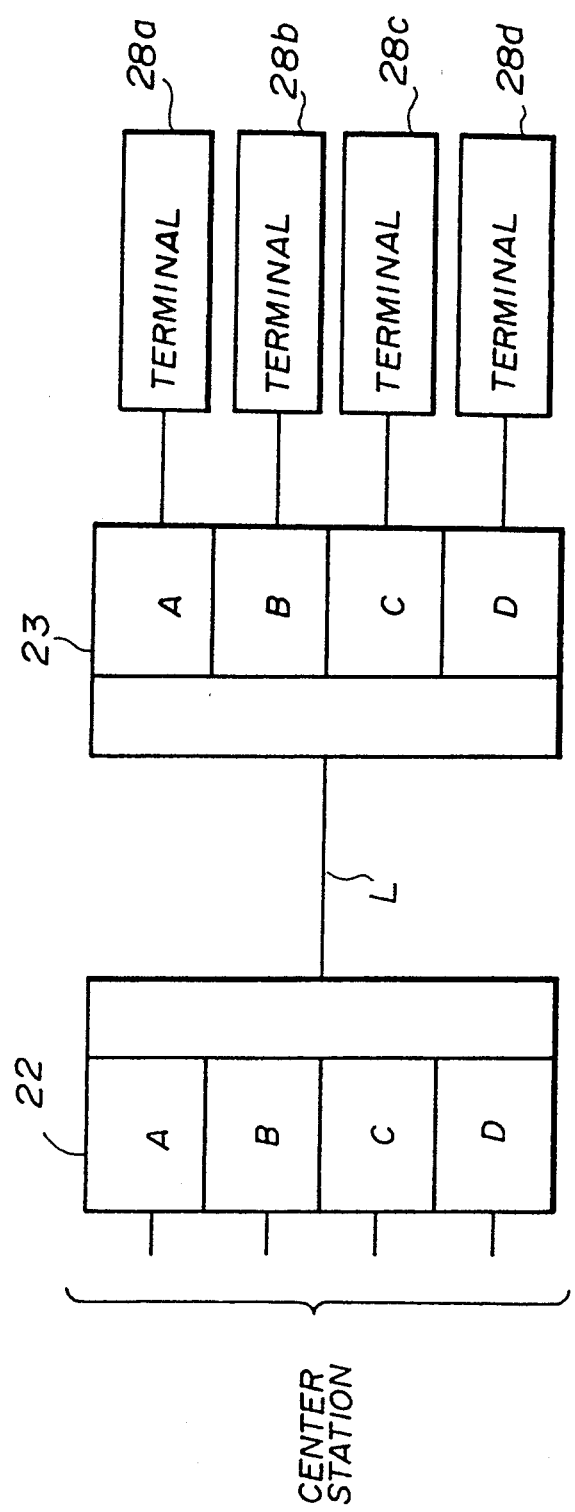

(A)

(B) 8000Hz (C) 2000Hz (D) ADVANCE / DELAY

SYSTEM FOR CONTROLLING FREQUENCY MULTIPLEXING MODEMS

BACKGROUND OF THE INVENTION

1. Field of the Invention

The present invention generally relates to a system for controlling frequency multiplexing modems, and more particularly to a system for controlling frequency multiplexing modems which transfer data via channels controllable independently.

2. Description of the Prior Art

Data communications systems utilizing analog transmission lines employ a modem (modulator/demodulator) for modulating an analog signal and demodulating a modulated signal. Such a modem includes a transmitter unit for modulating a carrier signal with respect to data to be transmitted, and a receiver unit for demodulating a modulated carrier signal received via an analog transmission line so as to obtain the original data.

Recent increase in the scale of communications networks requires a large number of modems to be connected to each other in a point-to-point connection manner.

FIG. 1A is a block diagram of a conventional point-to-point connection network, which includes a center station 7 and a plurality of terminals 8a–8d. The terminals 8a–8d are connected to the center station 7 via modems 1 provided at the side of the center station 7, and via modems 1 provided at the sides of the terminals 8a–8d.

FIG. 1B is a block diagram of another conventional point-to-point connection network, which includes a center station 7A, a repeater station 5 and terminals 8a–8d. The repeater station 5 includes a TDM (Time Division Multiplexing) modem unit 9A, and modems 1 connected to the TDM modem unit 9A and the modems 1 provided at the sides of the terminals 8a–8d. The center station 7A also includes a TDM modem unit 9B connected to the TDM modem unit 9A of the repeater station 5. It will be noted that the modems 1 are respectively provided for the terminals 8a–8d in the same manner as the connection network shown in FIG. 1A.

The connection networks shown in FIGS. 1A and 1B have a disadvantage in that the number of modems and transmission lines increase as the number of terminals increase. This increases the cost for building the networks.

FIG. 2 is a block diagram of an improved network directed to overcoming the above disadvantage. A center station 7B includes an FDM (Frequency Division Multiplexing) modem unit 2. The terminals 8a–8d are connected to the FDM modem unit 2 of the center station 7B via respective FDM modem units 2 provided at the sides of the terminals 8a–8d. A frequency band used for data transmission is segmented into four channels A, B, C and D having respective frequency bands. The terminals 8a, 8b, 8c and 8d are connected to the channels A, B, C and D of the four FDM modem units 2. The center station 7B can independently communicate with the terminals 8a–8d via the assigned channels. That is, four independent communications can take place by means of the single line. Hence, it is possible to greatly reduce the number of modems and the number of cables and to therefore reduce the cost.

However, the improved network shown in FIG. 2 has the following disadvantages. If the quality of reception of signals via one of the four channels deteriorates and communications taking place via the channel having the poor receiving quality substantially become impossible, supply of transmission energy to all of the channels is stopped, and a retraining process for identifying a cause of deterioration of the communications quality and recovering the abnormal channel is carried out for all the channels. Hence, it becomes necessary to interrupt communications via the normal channels.

In the retraining process, it is necessary for all the channels to be pulled in synchronization separately from each other. Hence, it takes a long time to perform the retraining process.

SUMMARY OF THE INVENTION

It is a general object of the present invention to provide a system for controlling frequency multiplexing modems in which the above disadvantages are eliminated.

A more specific object of the present invention is to provide a system for controlling frequency multiplexing modems in which the retraining process can be carried out for only an abnormal channel without interrupting communications via other normal channels.

The above objects of the present invention are achieved by a frequency multiplexing control system comprising: a first modem unit connected to a transmission line; a second modem unit connected to the transmission line, the first and second modem units communicating with each other via a plurality of primary channels and a secondary channel, the primary and secondary channels having different frequency bands; a plurality of first means, respectively provided in the first and second modem units, for detecting an abnormal primary channel and sending to the second and first modem units information concerning the abnormal primary channel via the secondary channel; and a plurality of second means, respectively provided in the first and second modem units, for disabling the abnormal primary channel in response to the information and for sending a training signal for recovering the abnormal primary channel into the transmission line.

BRIEF DESCRIPTION OF THE DRAWINGS

Other objects, features and advantages of the present invention will become more apparent from the following detailed description when read in conjunction with the accompanying drawings, in which:

FIGS. 3A and 3B are block diagrams illustrating the principle of the present invention; FIG. 4A is a block diagram of a communications system of the present invention;

DESCRIPTION OF THE PREFERRED EMBODIMENTS

Figure 3B:
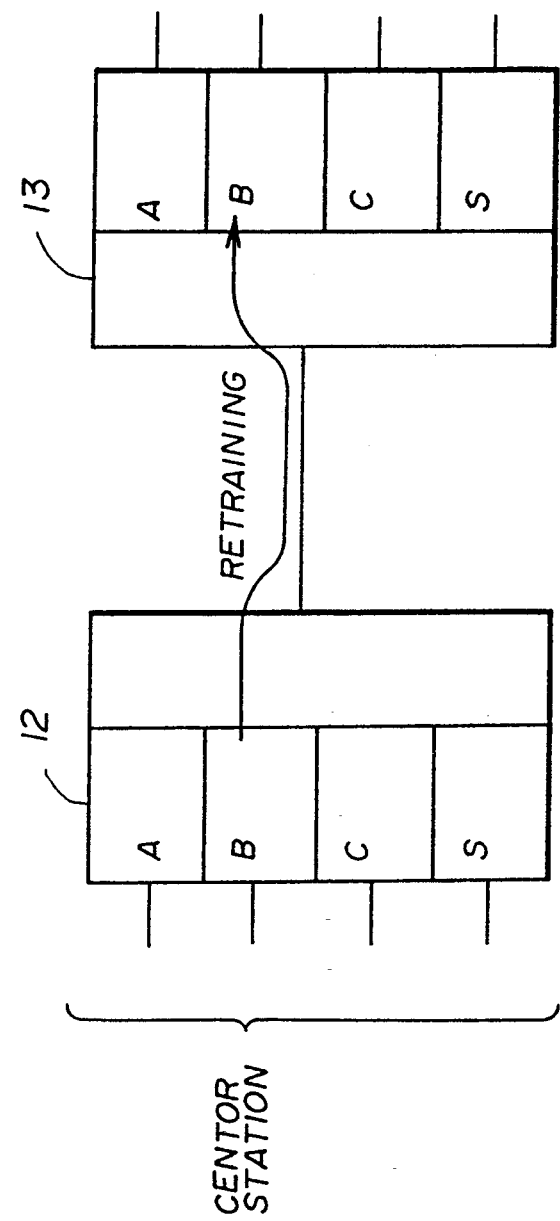

FIGS. 3A and 3B illustrate the principle of the present invention. Referring to FIG. 3A, a modem unit 12 and a modem unit 13 are connected to each other via a transmission line. Each of the modem units 12 and 13 handles three primary channels A, B and C obtained by segmenting a primary frequency band into three sub frequency bands, and a single secondary channel S using a frequency band lower than the primary frequency band. Each of the modem units 12 and 13 has the function of monitoring the channels A, B and C and detecting an abnormal channel having a poor quality of reception of signals. Further, each of the modem units 12 and 13 informs, via the secondary channel, the other modem unit other than the modem unit which detects the deterioration of the quality of the received signal, of the abnormal channel. The modem unit informed of the abnormal channel stops supplying transmission energy to the abnormal channel and sends the training signal thereto.

In FIG. 3A, the modem unit 13 detects an abnormal channel, and informs the modem unit 12 of the abnormal channel via the secondary channel. In FIG. 3B, the modem unit 12 sends the training signal to the modem unit 13 via the abnormal channel. In the above manner, it is possible to retrain only the abnormal channel without affecting the other normal channels.

FIG. 4A is a block diagram of a communications system according to an embodiment of the present invention. The system shown in FIG. 4 includes a center (or master) modem unit 22 and a subsidiary modem unit 23. A center station (not shown in FIG. 4A) is connected to the center modem unit 22. The center modem unit 22 is connected to the subsidiary modem unit 23 via a transmission line L.

Figure 4B:
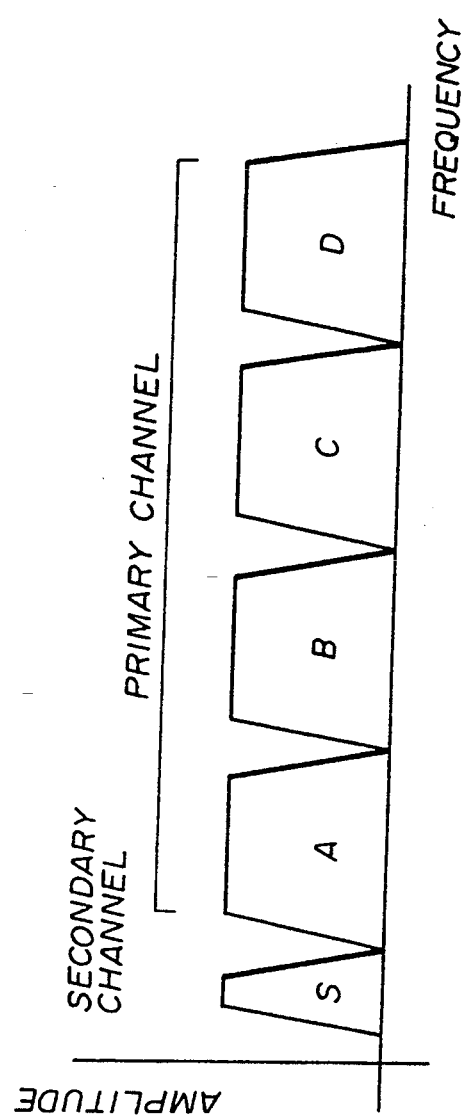
FIG. 4B is a graph showing a frequency band used in the system of the present inventions.

The system shown in FIG. 4A handles a predetermined frequency band, for example, a frequency range between 0.3 kHz and 3.4 kHz. As shown in FIG. 4B, the frequency band used in the system is segmented into a primary frequency band and a secondary frequency band lower than the primary frequency band. Four primary channels A, B, C and D are formed in the primary frequency band, and a secondary channel S is formed in the secondary frequency band. Each of the four channels has a bit rate of 4800 bps (bits per second). The terminals 28a, 28b, 28c and 28d are connected to the subsidiary modem unit 23 via the primary channels A, B, C and D, respectively.

Figure 5:
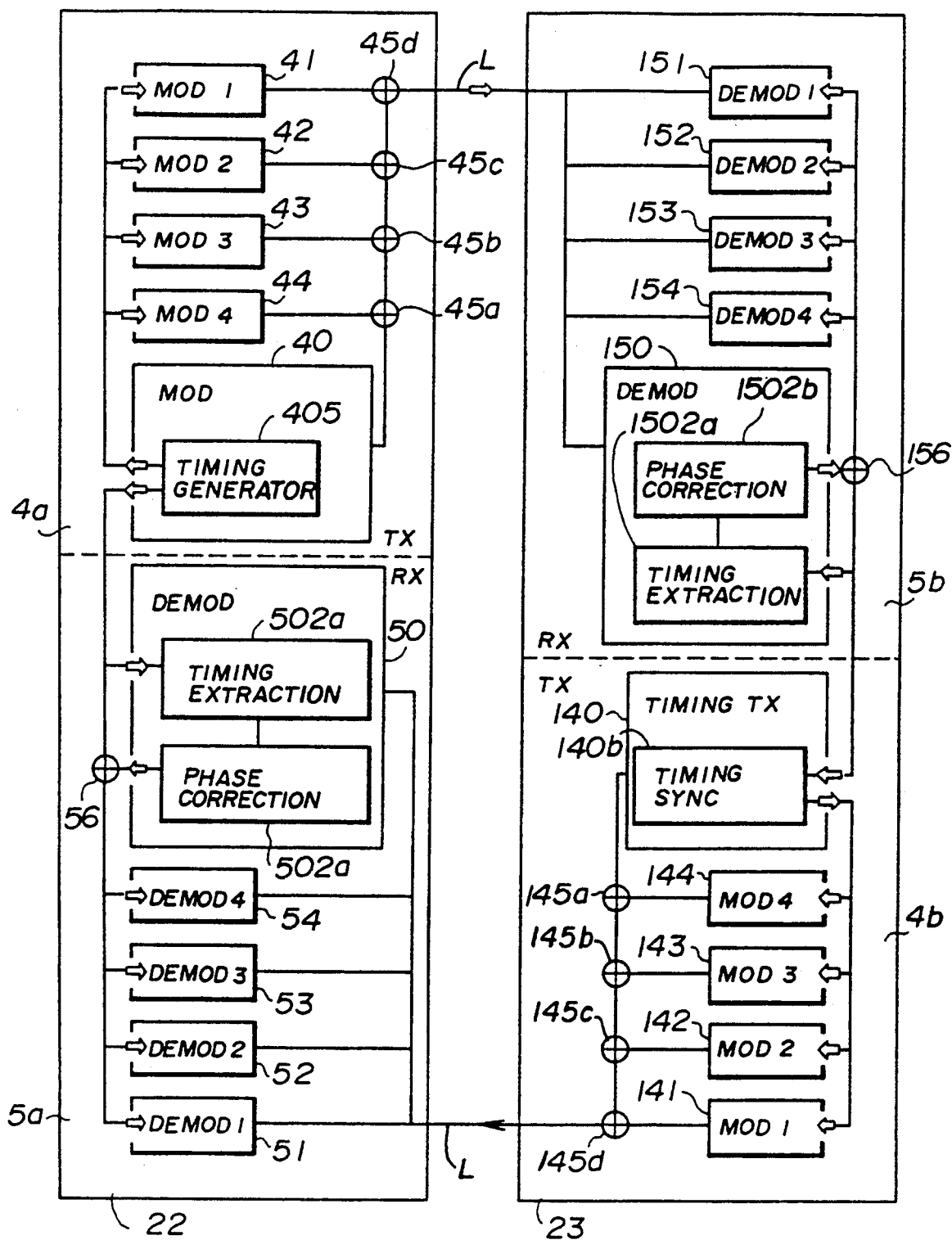
FIG. 5 is a block diagram illustrating the system of FIG. 4A in detail.

FIG. 5 shows the structure of the center modem 22 and the subsidiary modem 23 shown in FIG. 4A. The center modem 22 is made up of a signal transmitting unit 4a and a signal receiving unit 5a. The signal transmitting unit 4a includes primary-channel modulators 41, 42, 43 and 44, and a secondary-channel modulator 40. The primary-channel modulators 41, 42, 43 and 44 modulate signals to be transmitted via the primary channels A, B, C and D, respectively, and the secondary-channel modulator 40 modulates a signal to be transmitted via the secondary channel S. The secondary-channel modulator 40 includes a timing generator 405, which generates a timing clock signal. The primary-channel modulators 41-44 operate in synchronism with the timing signal generated by the timing generator 405.

Further, the signal transmitting unit 4a includes adders 45a, 45b, 45c and 45d. The adder 45a adds the output signals of the secondary-channel modulator 40 and the primary-channel modulator 44 to each other. The adder 45b adds the output signal of the modulator 43 and the output signal of the adder 45a. The adder 45c adds the output signal of the modulator 42 and the output signal of the adder 45b. The adder 45d adds the output signal of the modulator 41 and the output signal of the adder 45c. The output terminal of the adder 45d is connected to the transmission line L.

The signal receiving unit 5a of the center modem unit 22 includes primary-channel demodulators 51, 52, 53 and 54, and a secondary-channel demodulator 50. The primary-channel demodulators 51, 52, 53 and 54 demodulate signals received via the primary channels A, B, C and D, respectively, and the secondary-channel demodulator 50 demodulates a signal received via the secondary channel S. The secondary-channel demodulator 50 includes a timing extraction unit 502a and a phase correction unit 502b. The timing extraction unit 502a extracts a timing signal (slave clock signal) from a received signal transmitted via the secondary channel S. The phase correction unit 502b detects a difference between the phase of the timing signal supplied from the timing extraction unit 502a and the phase of the timing signal generated by the timing generator 405 of the secondary-channel modulator 40 of the signal transmitting unit 4a. The phase correction unit 502b controls the timing signal generated by the timing generator 405 by a phase difference detected by the phase correction unit 502b by adding the phase difference to the timing signal from the timing generator 405 by means of an adder 56.

The subsidiary modem unit 23 is made up of a signal transmitting unit 4b and a signal receiving unit 5b. The signal receiving unit 5b of the subsidiary modem unit 23 includes primary-channel demodulators 151, 152, 53 and 154, and a secondary-channel demodulator 150. The primary-channel demodulators 151, 152, 153 and 154 demodulate signals received via the primary channels A, B, C and D, respectively, and the secondary-channel demodulator 150 demodulates a signal received via the secondary channel S. The secondary-channel demodulator 50 includes a timing extraction unit 1502a and a phase correction unit 1502b. The timing extraction unit 1502a extracts the timing signal from a signal received via the secondary channel. The phase correction unit 1502b detects a difference between the phase of the timing signal supplied from the timing extraction unit 1502a and the phase of the timing signal generated by the timing generator 405 of the secondary-channel modulator 40 of the signal transmitting unit 4a. The phase correction unit 1502b controls the timing signal so that it is synchronized with the master timing signal generated by the timing generator 405. The primary-channel demodulators 150–154 operate in synchronism with the phase-corrected timing signal supplied via the adder 156.

The signal transmitting unit 4b includes primary-channel modulators 141, 142, 143 and 144, and a secondary-channel modulator 140. The primary-channel modulators 141, 142, 143 and 144 modulate signals to be transmitted via the primary channels A, B, C and D, respectively, and the secondary-channel modulator 140 modulates a signal to be transmitted via the secondary channel S. The secondary-channel modulator 140 includes a timing synchronizing unit 1405, which synchronizes the timing signal to be supplied to the modulators 141–144 with the timing signal from the signal receiving unit 5b. The primary-channel modulators 141–144 operate in synchronism with the timing signal generated by the timing synchronizing unit 1405.

Further, the signal transmitting unit 4b includes adders 145a, 145b, 145c and 145d. The adder 145a adds the output signals of the secondary-channel modulator 140 and the primary-channel modulator 144 to each other. The adder 145b adds the output signal of the modulator 143 and the output signal of the adder 145a. The adder 145c adds the output signal of the modulator 142 and the output signal of the adder 145b. The adder 145d adds the output signal of the modulator 141 and the output signal of the adder 145c. The output terminal of the adder 145d is connected to the transmission line L.

The structural elements shown in FIG. 5 can be formed by hardware and/or software. For example, units 4a, 5a, 4b and 5b are formed by processors, which execute programs describing the functions of the internal structural elements.

The signal receiving and signal transmitting units 4a, 5a, 4b and 5b operate in synchronism with the timing signal generated by the timing generator 405 of the secondary-channel modulator 40 of the signal transmitting unit 4a. That is, the timing signal generated by the timing generator 405 functions as a master clock, and the modem unit 23 extracts the master clock from the received signal. In this manner, the four primary channels can be completely synchronized with each other in the overall communications system, and the signal receiving (demodulating) processes for the primary channels at each of the modem units 22 and 23 can be simplified. Further, the timing signal is extracted via the signal received via the secondary channel S, and hence the timing extraction operation can also be simplified.

Furthermore, the modulating and demodulating operations on signals transmitted via the secondary channel can be carried out at a low bit rate. Hence, the modulating and demodulating operations are not affected by the conditions of the transmission lines, and there is substantially no possibility that the system fails to extract information concerning the timing signal. Moreover, the timing extracting process is carried out for the secondary channel, and can be commonly carried out for all the primary channels. When the quality of communications via one of the primary channels becomes poor, only the primary channel of interest is pulled in synchronization again. Hence, the time necessary to recover the overall system can be greatly reduced.

Figure 6:
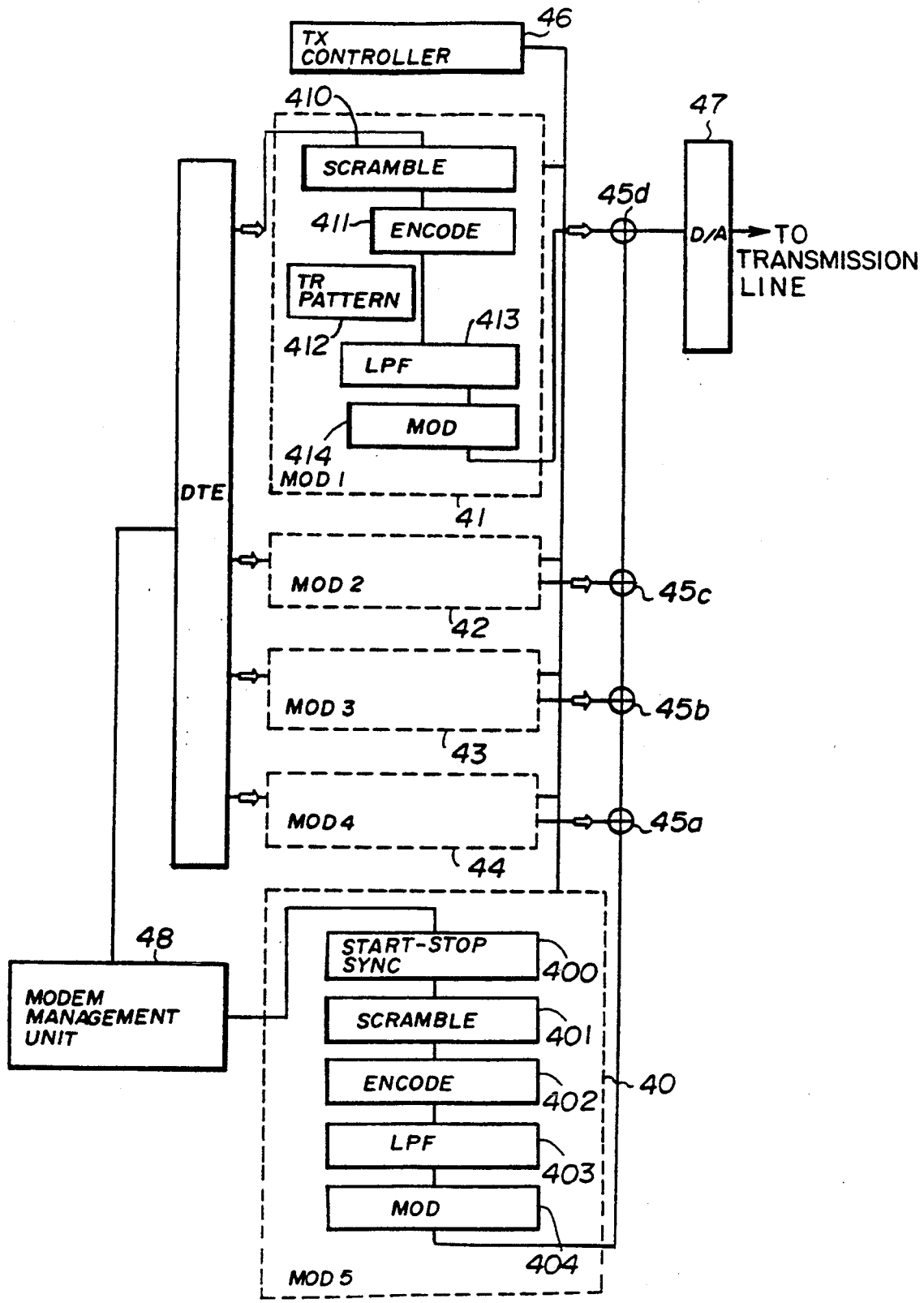
FIG. 6 is a block diagram of a signal transmitting unit shown in FIG. 5.

FIG. 6 is a block diagram of the signal transmitting unit 4a shown in FIG. 5. The signal transmitting unit 4b shown in FIG. 5 has the same structure as the signal transmitting unit 4a.

The secondary-channel modulator 40 is made up of a start-stop synchronization converter 400, a scrambler 401, an encoder 402, a transmission low-pass filter 403, and a modulator 404 connected as shown. The start-stop synchronization converter 400 converts a start-stop control signal from a modem management unit 48 into a synchronizing signal. The modem management unit 48 controls the operation of the overall modem unit 22. The scrambler 401 scrambles the synchronizing signal from the start-stop synchronization converter 400. The encoder 402 encodes the scrambled synchronizing signal into a signal. The transmission low-pass filter 403 allows only a low-frequency component signal of the code signal to pass therethrough. The modulator 404 modulates the output signal of the low-pass filter 403.

The primary channel modulators 41–44 for the primary channels A–D have the same structure. The modulator 41 shown in detail comprises a scrambler 410, an encoder 411, a training pattern generator 412, a transmission low-pass filter 413, and a modulator 414 connected as shown. The scrambler 410 scrambles a data signal received via a digital terminal equipment (DTE) interface 49. The encoder 411 encodes the output signal of the scrambler 410 into a code signal. The training pattern generator 412 generates a training pattern used for training. The transmission low-pass filter 413 allows only a low-frequency component signal of the code signal to pass therethrough. The frequency ranges of the low-pass filters of the modulators 41–44 are different from each other. The modulator 414 modulates the output signal of the low-pass filter 403.

The output signals of the primary-channel modulators 41–44 and the secondary-channel modulator 40 are added together by means of the aforementioned adders 45a–45d. The output terminal of the adder 45d is connected to the input terminal of a D/A (Digital-to-Analog) converter 47, which converts a digital modulated signal from the adder 45d into an analog modulated signal. A transmission controller 46 controls the modulators 40–44. The transmission controller 46 includes a master clock generator, which generates the master timing signal.

Figure 7:
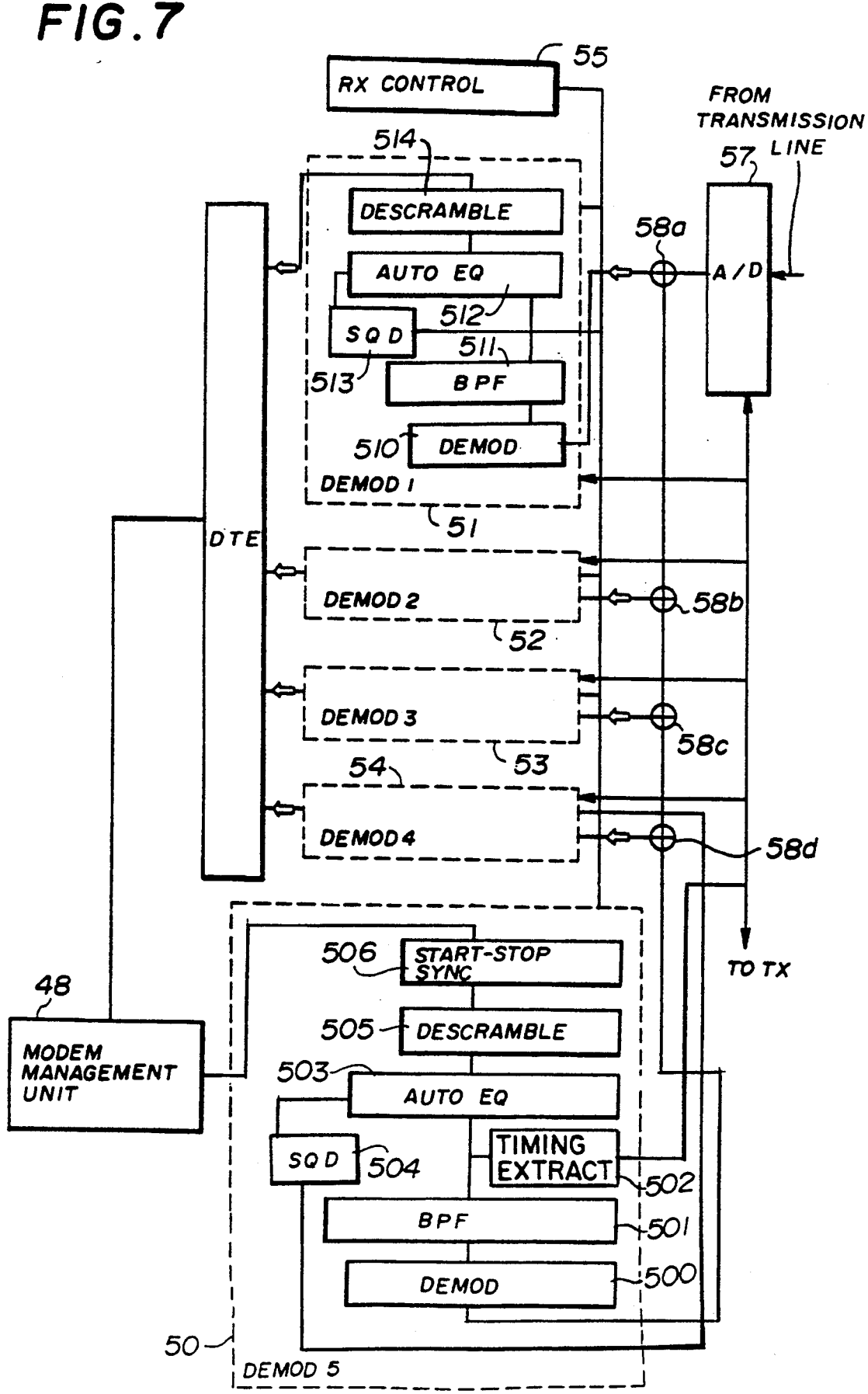
FIG. 7 is a block diagram of a signal receiving unit shown in FIG. 5.

FIG. 7 is a block diagram of the signal receiving unit 5a shown in FIG. 5. The signal receiving unit 5b also shown in FIG. 5 has the same structure as the signal receiving unit 5a except that the timing synchronizing unit 140b is used.

The secondary-channel demodulator 50 is made up of a demodulator 500, a band-pass filter 501, a timing extractor 502, an automatic equalizer 503, a signal quality decision (SQD) unit 504, a descrambler 505 and a start-stop synchronization converter 506. An A/D (Analog-to-Digital) converter 57 is connected to the transmission line, and converts an analog signal received via the transmission line into a digital signal. The demodulator 500 receives the digital signal via connection nodes 58a–58d, and demodulates it. The band-pass filter 501 allows only a frequency component of a demodulated signal from the demodulator 500 to pass through the filter 501, the above frequency component being present in the frequency band for the secondary channel. The timing extractor 502 extracts a timing component from the output signal of the band-pass filter 501, and outputs a reproduced timing signal to the demodulators 51–54 and the A/D converter 57. The automatic equalizer 503 equalizes the output signal of the band-pass filter 501 and thereby outputs a reproduced signal. The descrambler 505 descrambles the reproduced signal from the automatic equalizer 503. The start-stop synchronization converter 506 converts the descrambled signal (synchronizing signal) into a start-stop control signal. The signal quality decision unit 504 compares the input signal of the automatic equalizer 503 and the output signal thereof, and makes a decision on the quality of the received signal on the basis of an error corresponding to the difference between the compared input and output signals.

The primary channel demodulators 51-54 for the primary channels A-D have the same structure The demodulator 51 shown in detail is made up of a demodulator 510, a band-pass filter 511, an automatic equalizer 512, a signal quality decision (SQD) unit 513, and a descrambler 514. The demodulator 510 demodulates the digital signal from the A/D converter 57 via the connection node 58a. The band-pass filter 511 allows only a frequency component of a demodulated signal from the demodulator 510 to pass through the filter 511, the above frequency component being present in the primary channel A. The frequency bands of the band-pass filters 511 of the demodulators 51-54 are different from each other. The automatic equalizer 512 equalizes the signal component from the band-pass filter 511 and thereby outputs a reproduced signal. The descrambler 514 descrambles the reproduced signal from the automatic equalizer 512, and outputs a descrambled reproduced signal to the digital terminal equipment interface (DTE) 49. The signal quality decision unit 513 compares the input signal of the automatic equalizer 512 and the output signal thereof, and makes a decision on the quality of the received signal on the basis of an error corresponding to the difference between the compared input and output signals.

A receive controller 55 controls the demodulators 50-54, and monitors the decision outputs of the signal quality decision units 513 of the demodulators 51-54. Further, the receive controller 55 is connected to the transmission controller 46 shown in FIG. 6. The A/D converter 57 performs a sampling operation on the received analog signal by using the timing clock signal from the timing extractor 502.

Figure 8:
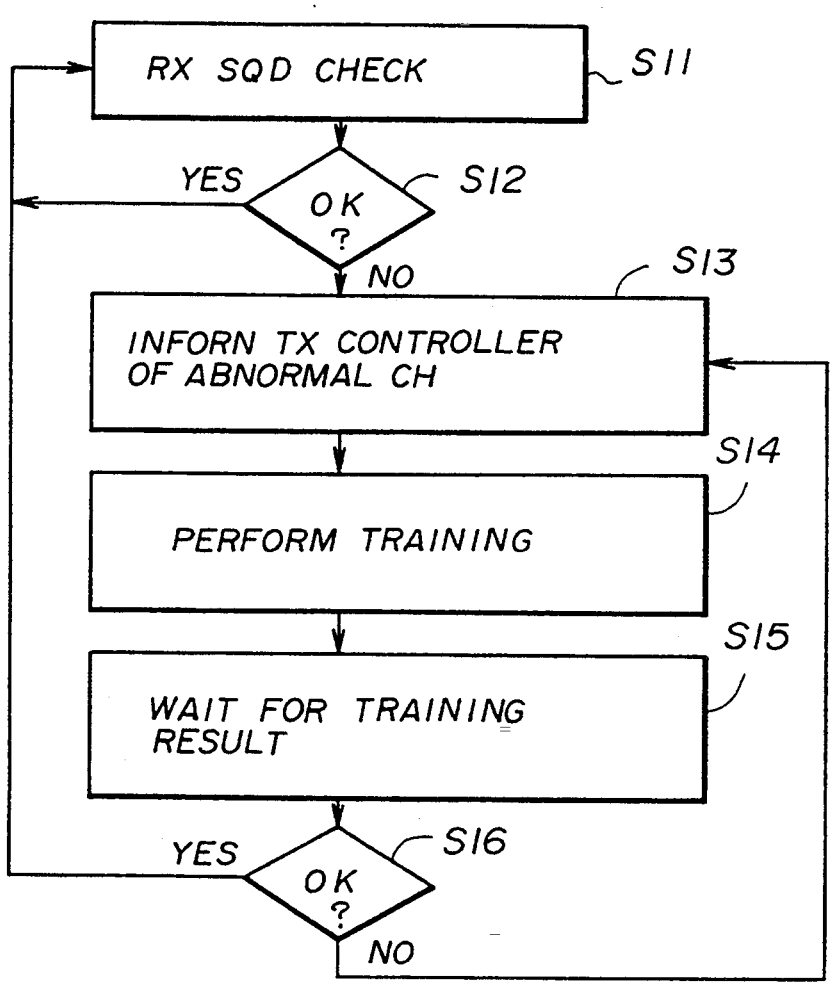
FIG. 8 is a flowchart showing the operation of the embodiment of the present invention.

FIG. 8 is a flowchart of the operation of the system of the present invention. In steps S11 and S12, the receive controller 55 determines, on the basis of the decision outputs of the signal quality decision units 513 of the demodulators 51-54, whether or not the signals received via the primary channels A-D are maintained in good conditions. When the decision result of step S12 is YES, step S11 is carried out again. That is, step 11 is repeatedly carried out. When the result of the step-S12 decision is NO, the receive controller 55 informs the transmission controller 46 of an abnormal primary channel identified by the signal quality decision in step S13. Then, the transmission controller 46 informs the secondary-channel modulator 40 of the abnormal primary channel. For example, information indicating the abnormal primary channel is input to the start-stop synchronization converter 400 connected to the modem management unit 48. Then, the information indicating the abnormal primary channel is output to the transmission line via the D/A converter 47.

The secondary-channel demodulator 50 of the remote modem unit receives the information indicating the abnormal primary channel via the A/D converter 57. The information is then sent to the receive controller 55 via the start-stop synchronization converter 506 or the modem management unit 48. Then, the receive controller 55 informs the transmission controller 46 of the received information indicating the abnormal channel. In response to receipt of the above information, the transmission controller 46 instructs the modem of the abnormal primary channel to disable the normal operation of the modulator 414. Then, the transmission controller 46 instructs the training pattern generator 412 to output the training pattern to the transmission low-pass filter 413. The training pattern is then sent to the transmission line via the modulator, the adder 45d and the D/A converter 47. The above sequential process is carried out in step S14 shown in FIG. 8.

The demodulator 510 of the abnormal primary channel receives the training pattern via the A/D converter 57, and informs the output signal of the modem (that is, the results of the training) of the receive controller 55 via, for example, the digital terminal equipment interface and the modem management unit 48. When the results of the training are good, the receive controller 55 restarts to execute step S11. When the results of the training are not good, the receive controller 55 executes step S13 in order to have the training performed again.

While the abnormal primary channel is identified and the training is performed, the other normal primary channels independently provide services. Hence, the abnormal primary channel can be recovered without affecting the normal primary channels. The subsidiary modem 23 operates in synchronism with the master clock generated in the center modem 22. Hence, the synchronizing process for the abnormal channel has been completed when the training pattern is output to the transmission line. Hence, it is possible to greatly reduce the training time.

As has been described above, the secondary channel is used to send information concerning an abnormal primary channel to the remote modem unit and to extract timing information from the signal component transmitted via the secondary channel.

Figure 9:
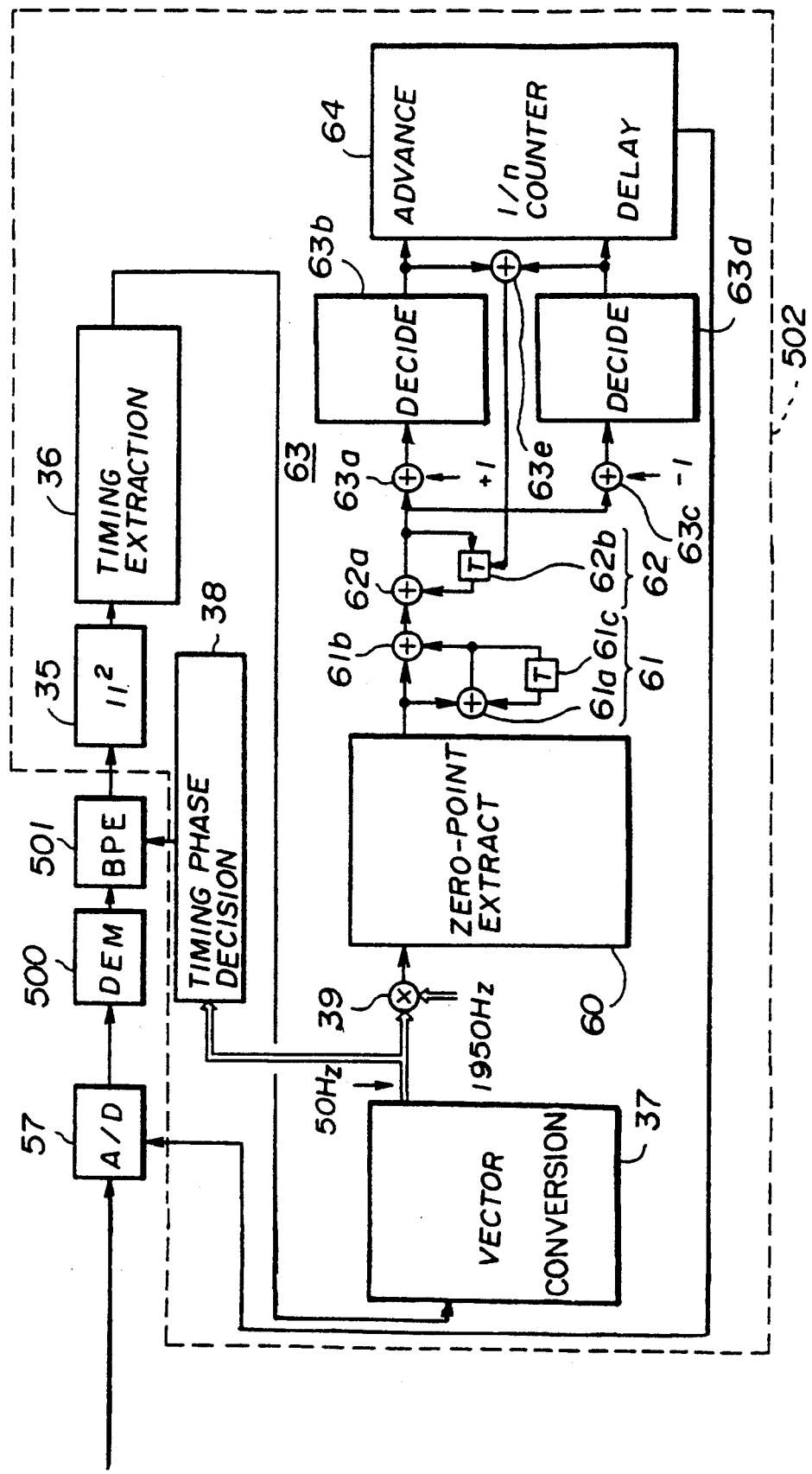
FIG. 9 is a block diagram of a timing extractor shown in FIG. 7.

FIG. 9 is a block diagram of the timing extractor 502 of the secondary-channel demodulator 50. The timing extractor 502 is configured as follows. A square multiplier 35 connected to the band-pass filter (roll-off) filter 501 squares the output signal of the roll-off filter 501 to thereby extract energy of the signal transmitted via the secondary channel. A timing extractor 36 extracts energy of the timing signal component from the output signal of the square multiplier 35. A vector conversion unit 37 generates a vector signal from the timing signal component from the timing extractor 36, which is a scaler signal. A timing phase decision unit 38 identifies the phase of the extracted timing signal component and generates a control signal based on the identified phase. The control signal is applied to the roll-off filter 501 in order to change the tap coefficients of the roll-off filter 501.

A multiplier 39 multiplies the timing signal (vector) having a frequency of, for example, 50 Hz, by a reference signal (vector) having a frequency of, for example, 1950 Hz, and thereby generates a timing signal having a frequency of 2000 Hz. A zero-point extractor 60 samples the timing signal from the multiplier 39 at a baud-rate clock signal (2000 Hz), and thereby generates phase error signal samples.

A primary integration circuit 61 executes a frequency integration operation on a series of samples from the zero-point extractor 60, and includes two adders 61a and 61b and a delay element 61c having the unit delay time. The adder 61a adds the current sample to the previous sample prior to the current sample by the unit delay time T. The adder 61b adds the current sample to the output signal of the adder 61a. The first integration circuit 61 functions to stabilize the frequency components affected by jitter. A secondary integration circuit 62 includes an adder 62a and a delay element 62b having the unit delay time T. The adder 62a adds the current sample from the circuit 61 to the previous sample from the delay element 62b.

A decision unit 63 includes adders 63a, 63c and 63e, and polarity decision units 63b and 63d. The adder 63a adds "1" to the output signal of the secondary integration circuit 62. The polarity decision unit 63b determines whether or not the output signal from the adder 63a advances by determining whether or not the polarity of the output signal from the adder 63a is positive. The decision result is added to the adder 63e. The adder 63c adds "−1" to the output signal of the secondary integration circuit 62. The polarity decision unit 63d determines whether or not the output signal from the adder 63c delays by determining whether or not the polarity of the output signal from the adder 63c is negative. The decision result is added to the adder 63e. The output signal of the adder 63e is applied to the delay element 62b in order to reset the value of the tap T. A 1/n counter 64 has a variable frequency dividing ratio, and receives the decision results from the polarity decision units 63b and 63d. When the decision result from the polarity decision unit 63b shows that the phase of the timing signal advances, the frequency dividing ratio decreases to decrease the frequency. When the decision result from the polarity decision unit 63d shows that the phase of the timing signal delays, the frequency dividing ratio increases to increase the frequency. The output signal of the 1/n counter 64 serves as an internal timing signal, which is applied to the A/D converter 57, which samples the analog signal at the frequency of the internal timing signal.

Figure 10:
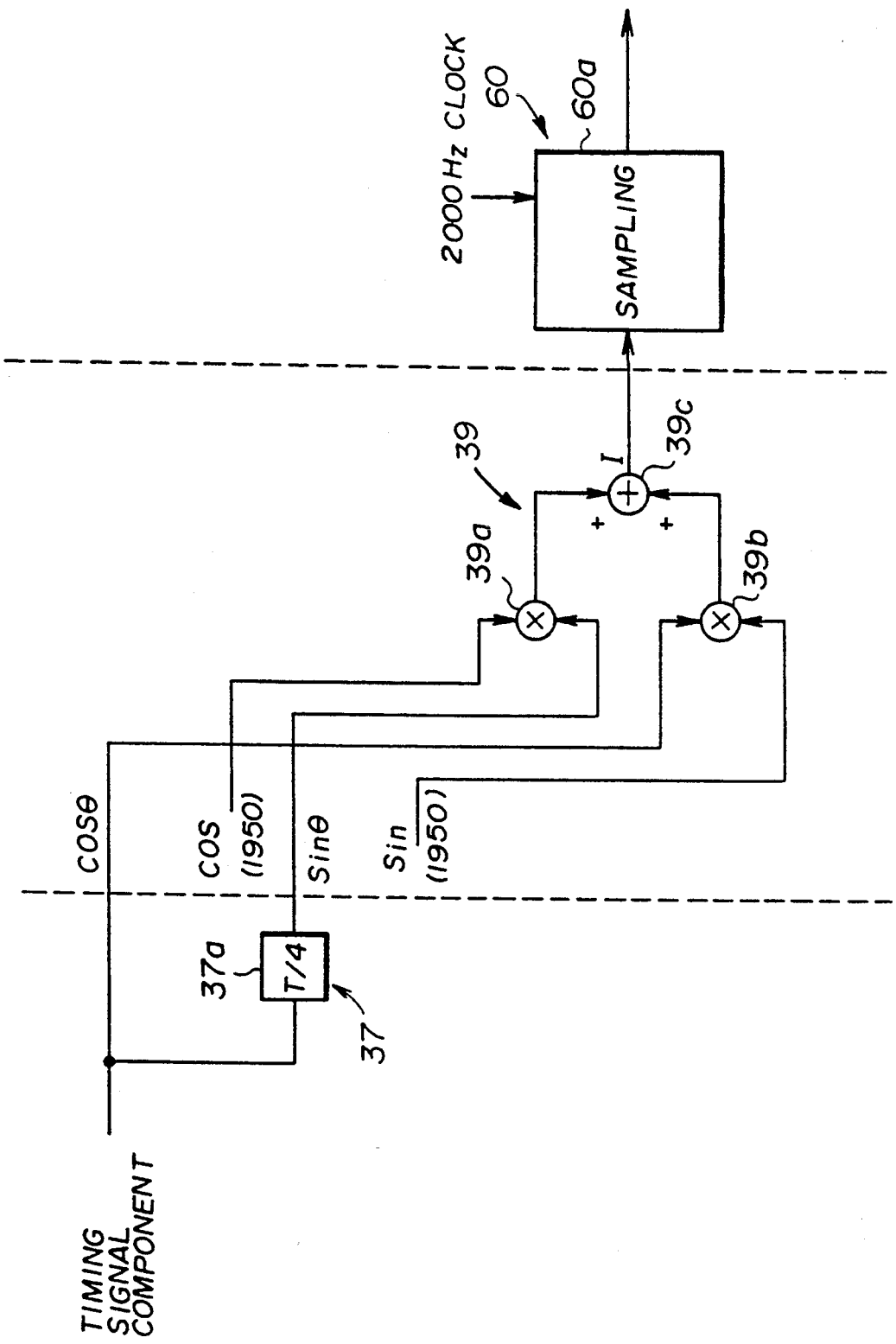
FIG. 10 is a block diagram of a vector conversion unit, a multiplier and a zero-point extractor shown in FIG. 9.

FIG. 10 shows the vector conversion unit 37, the multiplier 39 and the zero-point extractor 60. The vector conversion unit 37 includes a T/4 delay unit 37a, which delays the timing component (a cos $\theta$ component) from the timing extractor 36 by T/4 where T is the unit delay time. Hence, the output signal of the T/4 delay unit 37a is a cos $\theta$ component.

The multiplier 39 multiplies the vector signal by 1950 Hz, that is, (sin $\theta$+jcos $\theta$)×(sin 1950+jcos 1950)=sin $\theta$·sin 1950−cos $\theta$·cos 1950)+j(sin $\theta$·cos 1950+cos $\theta$·sin 1950). In practice, either the real component or the imaginary component can be used for timing extraction. Hence, as shown in FIG. 10, the multiplier 39 is designed to handle the imaginary component I, and therefore comprises multipliers 39a and 39b and an adder 39c. More particularly, the multiplier 39a calculates sin $\theta$·cos 1950, and the multiplier 39b calculates cos $\theta$·sin 1950. The adder 39c adds the output signals of the multipliers 39a and 39b to each other.

The zero-point extractor 60 includes a sampling circuit 60a, which samples the output signal of the adder 39c at a baud rate clock of 2000 Hz.

Figure 11:
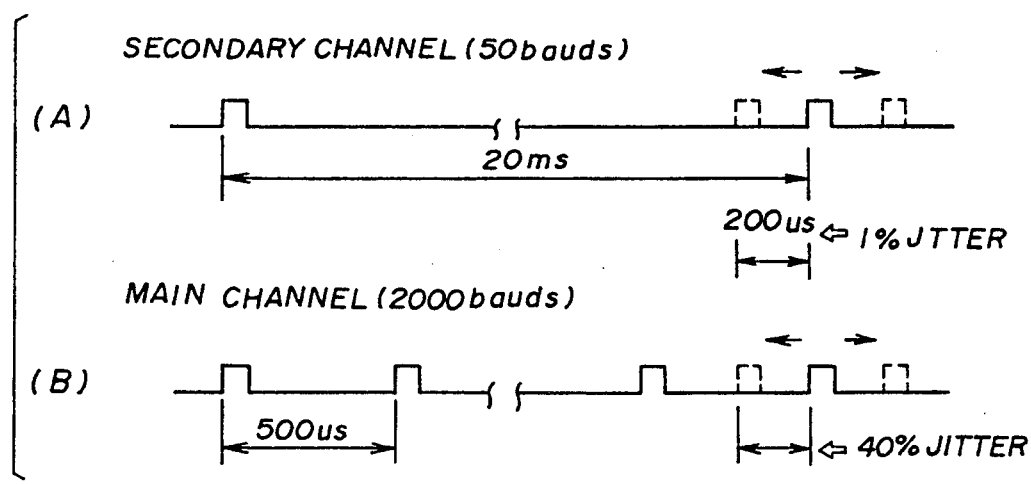
FIGS. 11(A) and (B), and 12(A), (B), and (C) are waveform diagrams showing a vector conversion process and a zero-cross extracting process performed in the timing extractor.

A description will now be given of the operation of the first embodiment of the present invention. It will now be assumed that the primary channel has a transmission speed of 2000 bauds ((A) of FIG. 11), the secondary channel has a transmission speed of 60 bauds ((B) of FIG. 11), and the sampling clock signal has a frequency of 8000 Hz.

The signal received via the analog communications line is sampled at the sampling clock signal having a frequency of 8000 Hz. The digital signal passes through the demodulator 500 and the roll-off filter 501. When the roll-off rate is 100%, the timing component can be accurately extracted from the output signal of the demodulator 500.

Figure 12:
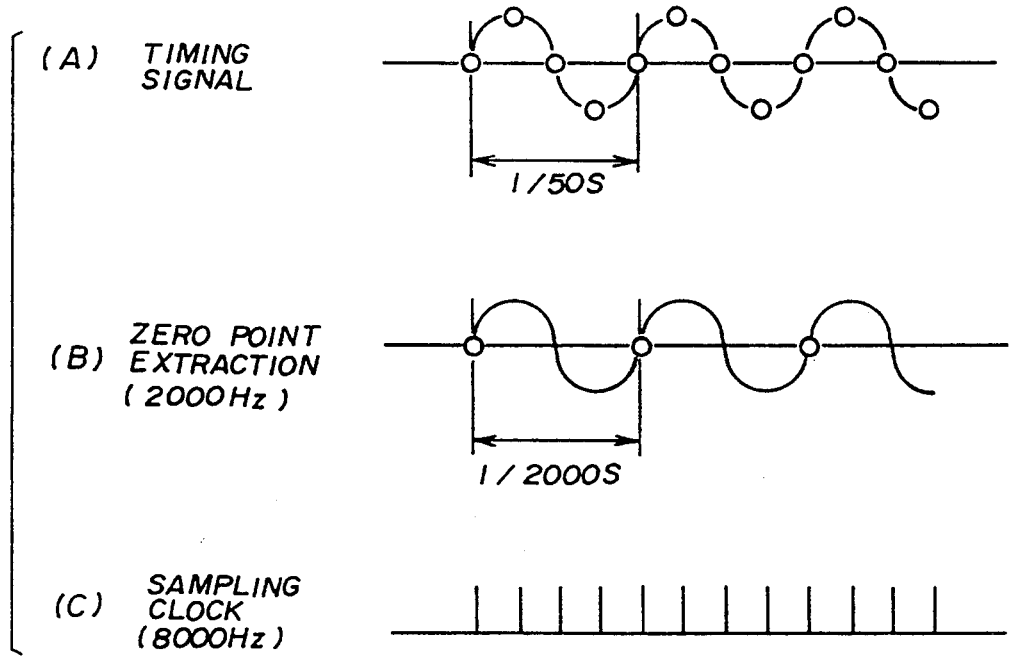
Figure 13A:
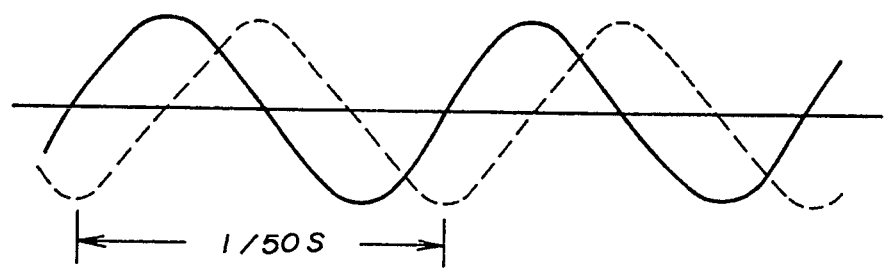
FIGS. 13A, 13B and 13C are diagrams showing a frequency shifting operation performed in the timing extractor.

The output signal of the roll-off filter 501 is squared by the square multiplier 35 to thereby generate the energy of the timing component. The timing extractor 36 extracts the timing component, as shown in (A) of FIG. 12 or FIG. 13A. The timing component is a 50 Hz signal, and one period thereof is 20 ms (=1/50 sec). In FIG. 13A, two timing components are illustrated.

Figure 13B:
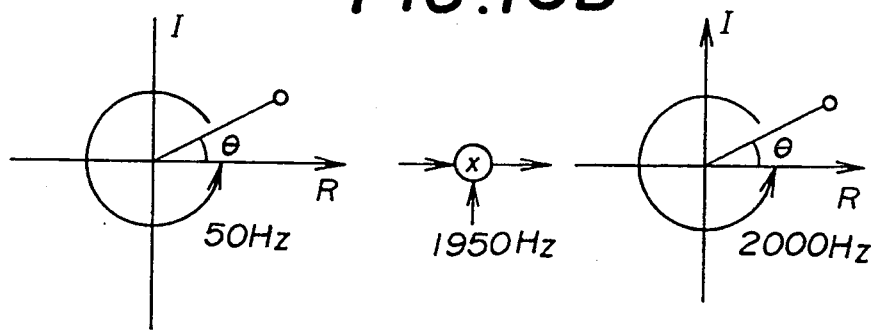
Figure 13C:
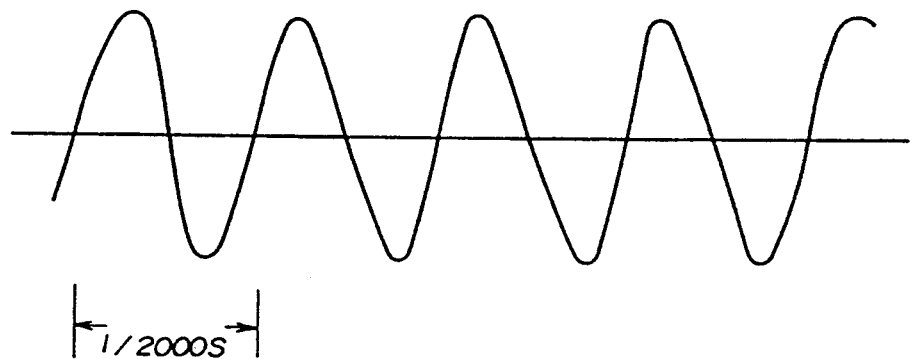

A 1% jitter contained in the 50 Hz timing component corresponds to a 40% jitter in the main channel because the main channel has a transmission speed of 2000 bauds and one period thereof is 500 82 s. In order to make a 1% jitter in the 50 Hz timing component appear as a 1% jitter in the main channel, the frequency of the 50 Hz timing component is shifted to the transmission speed of the main channel. For this purpose, as shown in FIG. 13B, the timing component which is a scaler signal from the timing extractor 36 is converted into a vector signal by the vector conversion unit 37, and is multiplied by the 1950 Hz signal by the multiplier 39. In this manner, the timing signal of a frequency of 2000 Hz as shown in FIG. 8C is generated by the multiplier 39.

Figure 14:
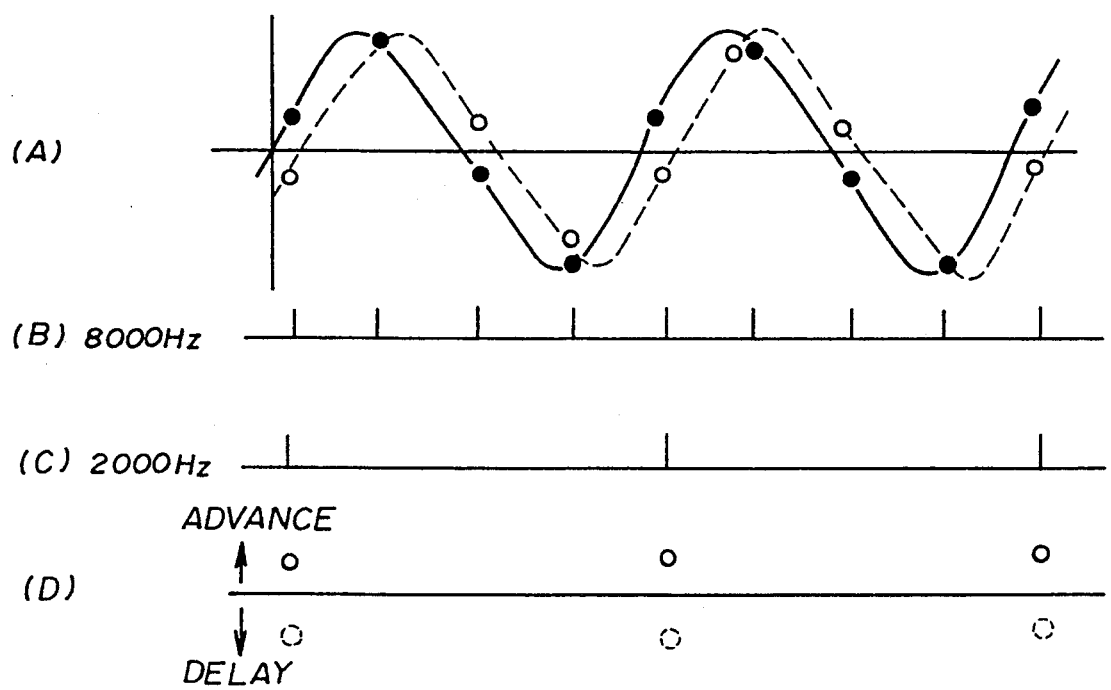
FIG. 14 is a diagram showing a frequency shifting operation performed in the timing extractor.

In practice, the 2000 Hz timing signal consists of samples obtained by sampling at a sampling frequency of 8000 Hz, as shown in (A) and (B) of FIG. 14. That is, samples indicated by dots are output from the multiplier 39. The zero-point extractor 60 extracts the samples at a sampling frequency of 2000 Hz shown in (C) of FIG. 14. In this manner, a phase error indicating whether the timing signal advances or delays can be obtained for each period of the 2000 Hz scamping clock, as shown in (D) of FIG. 14.

The phase error in the timing signal is subjected to the frequency integration operation by the primary integration circuit 61. The secondary integration circuit 62 executes the phase integration operation on the output signal of the primary integration circuit 61. The output signal of the secondary integration circuit 62 is applied to the decision unit 63.

Figure 15:
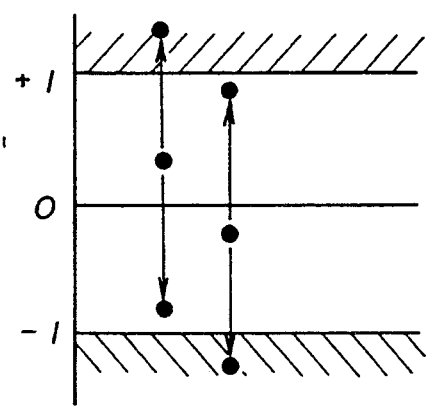
FIG. 15 is a diagram showing a decision process performed in the timing extractor.

In order to make the phase decision, "+1" and "−1" are respectively added to the output signal of the secondary integration circuit 62. Hence, as shown in FIG. 15, it is possible to accurately determine whether the phase errors in the timing signal existing in the range between −1 and +1 respectively advance or delay.

The frequency dividing ratio of the 1/n counter 64 is changed in response to the output signals of the polarity decision units 63b and 63d. Thereby, the 8000 Hz internal timing signal synchronized with the extracted timing signal can be generated. The internal timing signal is applied to the A/D converter 57, which samples the analog signal in synchronism with the timing signal contained in the received signal. Hence, the main channel system 200 can reproduce the original transmission data. The sum of the output signals of the polarity decision units 63b and 63d is applied to the delay element 62b, and the value of the tap T is reset.

Since the timing component is extracted from the signal transmitted via the secondary channel, it is possible to use the roll-off filter having a roll-off rate of 4% and increase the transmission speed of the main channel to 2000 bauds.

Figure 1A:
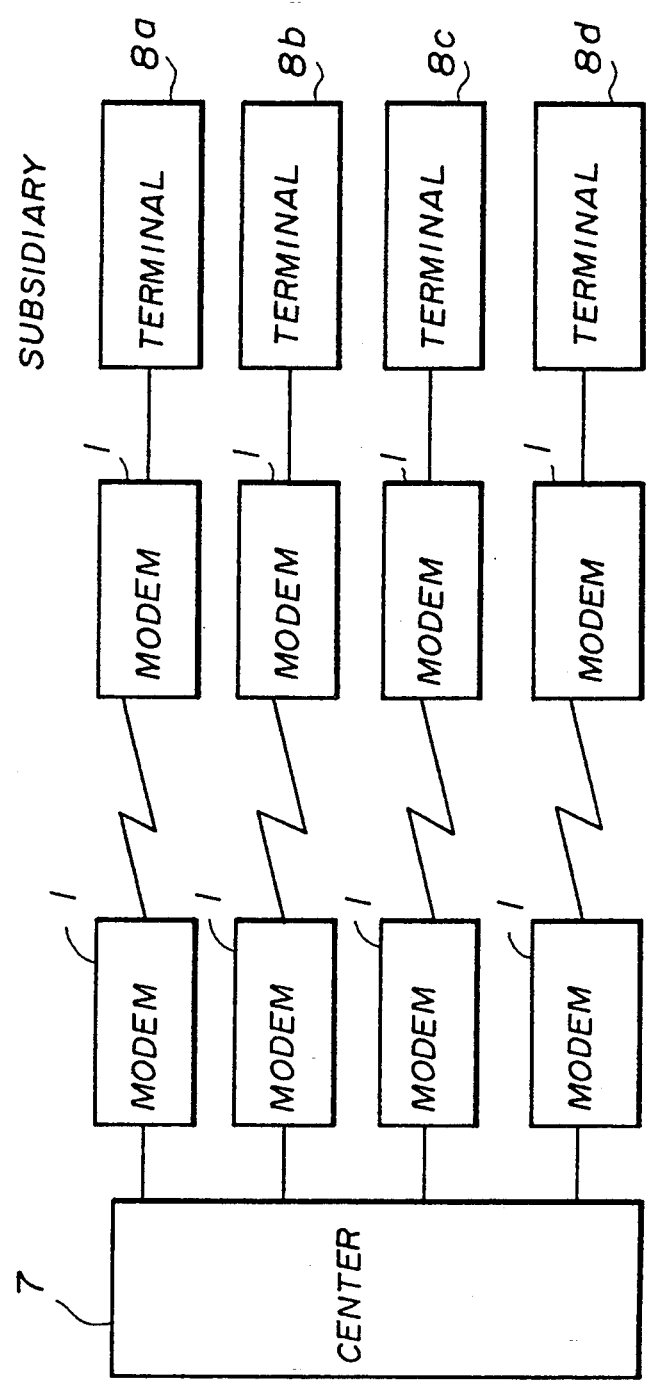
FIG. 1A is a block diagram of a conventional connection network.
Figure 1B:
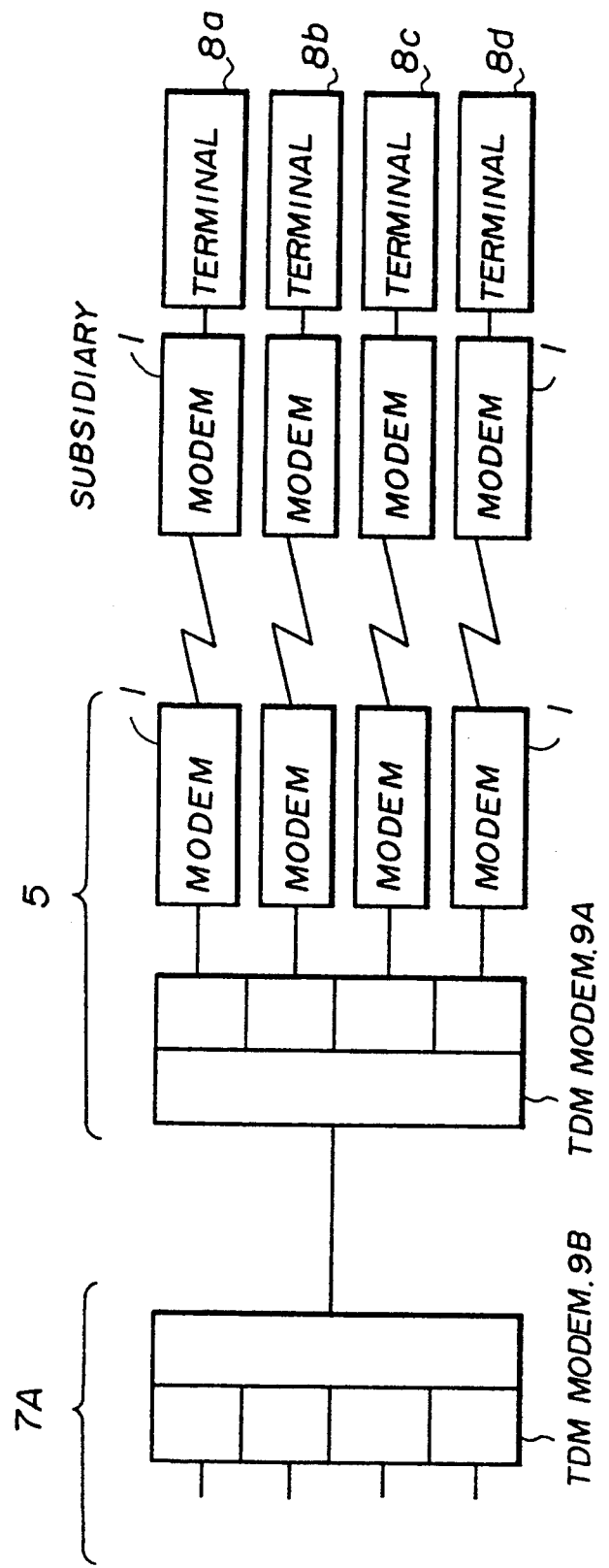
FIG. 1B is a block diagram of another conventional connection network.
Figure 2:
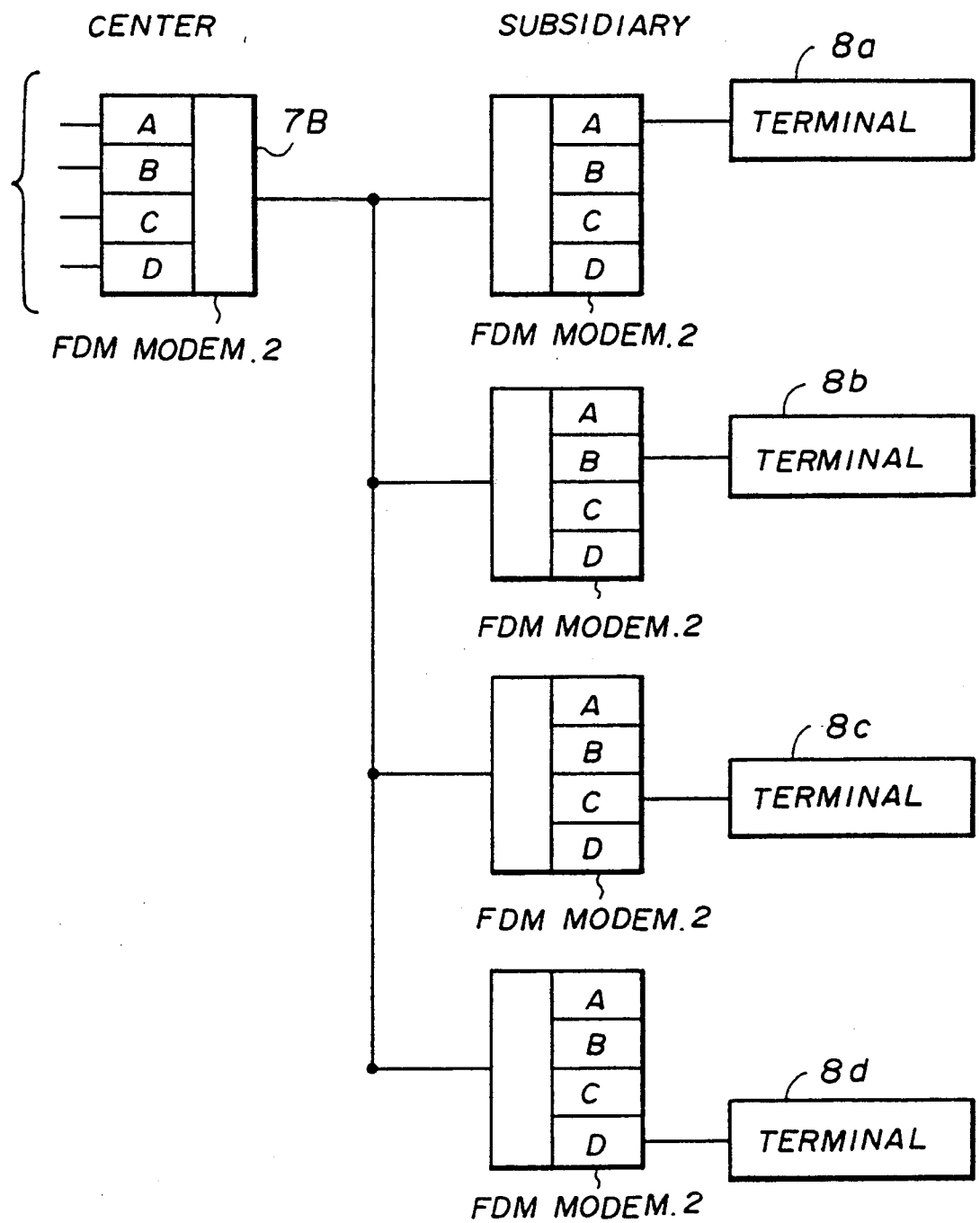
FIG. 2 is a block diagram of an improved conventional connection network.

The above-mentioned embodiment of the present invention is not limited to the network shown in FIG. 4A. For example, the present invention can be applied to a network as shown in FIG. 2. The present invention is not limited to use of four primary channels. The present invention can be applied to an arbitrary number of primary channels. The timing extractor 502 is not limited to the structure shown in FIG. 9.

The present invention is not limited to the specifically disclosed embodiments, and variations and modifications may be made without departing from the scope of the present invention.

What is claimed is:

1. A frequency multiplexing control system comprising:
    a first modem unit connected to a transmission line;
    a second modem unit connected to said transmission line, the first and second modem units communicating with each other via a plurality of primary channels;
    a secondary channel provided between the first and second modem units, the secondary channel having a frequency band lower than frequency bands of the primary channels;
    a plurality of first means, respectively provided in the first and second modem units, for detecting an abnormal primary channel and sending to the second and first modem units information concerning the abnormal primary channel via the secondary channel; and
    a plurality of second means, respectively provided in the first and second modem units, for disabling the abnormal primary channel in response to said information and for sending a training signal for recovering the abnormal primary channel to the transmission line, via the secondary channel.

2. The frequency multiplexing control system as claimed in claim 1, wherein:
    said first modem unit comprises master clock generating means for generating a master clock signal and sending a timing signal related to the master clock signal to the second modem unit via the secondary channel; and
    said second modem unit comprises clock extracting means for extracting the timing signal sent via the secondary channel and for generating a slave clock signal which is the same as the master clock signal, and
    wherein the second modem unit is synchronized with the first modem unit.

3. The frequency multiplexing control system as claimed in claim 2, wherein:
    the first modem unit comprises a plurality of modems operating in synchronism with the master clock signal; and
    the second modem unit comprises a plurality of modems operating in synchronism with the slave clock signal which is the same as the master clock signal.

4. The frequency multiplexing control system as claimed in claim 2, wherein:
    the first modem unit comprises first conversion means for performing digital-to-analog and analog-to-digital operations on signals to be transmitted to the second modem unit and signals received therefrom; and
    the second modem unit comprises second conversion means for performing digital-to-analog and analog-to-digital operations on signals to be transmitted to the first modem unit and signals received therefrom.

5. The frequency multiplexing control system as claimed in claim 1, wherein the frequency band of the secondary channel is lower than the frequency bands of the primary channels.

6. The frequency multiplexing control system as claimed in claim 1,
    which comprises n second modem units where n is an integer equal in number to the primary channels; wherein
    the n second modem units are connected to the transmission line.

7. The frequency multiplexing control system as claimed in claim 6, wherein each of the second modem units accommodates a terminal connected to the transmission line via a different one of the primary channels.

8. The frequency multiplexing control system as claimed in claim 1, wherein the second modem unit accommodates terminals respectively provided for the primary channels.

9. The frequency multiplexing control system as claimed in claim 1, wherein the transmission line is an analog transmission line.

10. The frequency multiplexing control system as claimed in claim 1, wherein:
    said first modem unit comprises master clock generating means for generating a master clock signal and sending a timing signal related to the master clock signal to the second modem unit via the secondary channel;
    said second modem unit comprises clock extracting means for extracting the timing signal sent via the secondary channel and for generating a slave clock signal which is the same as the master clock signal;
    the second modem unit is synchronized with the first modem unit;
    the first modem unit comprises a plurality of modems operating in synchronism with the master clock;
    the second modem unit comprises a plurality of modems operating in synchronism with the slave clock signal which is the same as the master clock signal;
    the first modem unit comprises first conversion means for performing digital-to-analog and analog-to-digital operations on signals to be transmitted to the second modulation unit and signals received therefrom; and
    the second modem unit comprises second conversion means for performing digital-to-analog and analog-to-digital operations on signals to be transmitted to the first modem unit and signals received therefrom.

\* \* \* \* \*